(12) United States Patent
Klapman

(10) Patent No.: US 6,674,461 B1
(45) Date of Patent: *Jan. 6, 2004

(54) EXTENDED VIEW MORPHING

(76) Inventor: Matthew H. Klapman, 3825 Charles Dr., Northbrook, IL (US) 60062

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,775

(22) Filed: Jul. 7, 1999

Related U.S. Application Data

(60) Provisional application No. 60/091,942, filed on Jul. 7, 1998.

(51) Int. Cl.[7] .................. H04N 15/00; G06T 13/00; G06K 9/00
(52) U.S. Cl. .................. 348/42; 345/474; 382/154
(58) Field of Search ................ 348/42, 47, 48, 348/139, 142, 144, 157; 345/424, 427, 474; 382/154, 285

(56) References Cited

U.S. PATENT DOCUMENTS

| | | | | | |
|---|---|---|---|---|---|
| 5,745,126 A | * | 4/1998 | Jain et al. | .................. | 348/42 |
| 6,072,504 A | * | 6/2000 | Segen | .................. | 345/474 |
| 6,084,979 A | * | 7/2000 | Kanade et al. | .................. | 348/48 |
| 6,271,855 B1 | * | 8/2001 | Shum et al. | .................. | 382/154 |
| 6,363,170 B1 | * | 3/2002 | Seitz et al. | .................. | 382/154 |

OTHER PUBLICATIONS

Seitz, Steven M., *Bringing Photographs to Life with View Morphing*, Dept. of Computer Science, U. of Wis., Madison (no date).
Seitz, Steven M., et al., *Physically–Valid View Synthesis by Image Interpolation*, Proc. Workshop on Representations of Visual Scenes, Cambridge MA (1995).
Seitz, Steven M., et al.; *View Morphing*, Dept. of Computer Science, U. of Wis., Madison (no date).

* cited by examiner

*Primary Examiner*—Gims S. Philippe

(57) ABSTRACT

A method and apparatus are provided for synthesizing an image from a plurality of video streams. The method includes the steps of determining an orientation of a first and second video source of the plurality of video streams with respect to a video object lying within a field of view of both the first and second video sources and selecting an orientation of a synthesized video source with respect to the video object. The method further includes the step of interpolating among corresponding images of the first and second video sources to form a stream of perspective images of the video object from the selected orientation of the synthesized source.

19 Claims, 6 Drawing Sheets

EXTENDED VIEW MORPHING

This is a non provisional application, from provisional application Serial No. 60/091,942, filed Jul. 7, 1998.

FIELD OF THE INVENTION

The field of the invention relates to video processing and more particularly to the altering of video images.

BACKGROUND OF THE INVENTION

It is a common practice for a director to provide the "most advantageous view" of the subject matter. Sporting events, for example, usually have multiple cameras strategically positioned around the event to capture the most important point-of-view that changes position over time. Changing this view point can be as simple as the director switching from one camera's output to another camera's output, or having the camera operator re-position or re-orient the camera to a new setting. Similarly, a newsworthy event requires the best vantage point to best capture the moment and gather all of the pertinent happenings around the event.

In many cases, it is difficult to capture the best view of the subject matter. This may be due to the difficulty of camera placement (behind a group of other reporters who swarm a celebrity), or not switching quickly enough between cameras (the director makes a human error). To overcome the problem of camera placement, many techniques has been devised. One solution is to mount remote cameras onto various objects, such as on a remote control aircraft, placement on a participant's body (in a quarterback's football helmet), mounting the camera on a pole held by the operator, etc.

In order to solve the possible director error, and to also add value to the product presented to the viewer, multiple video feeds can be sent to the viewer, who can select their favorite vantage point, or see multiple vantage points at one time. New data streaming standards, such as ASF and MPEG-4, for example, are planned to allow multiple video feeds through a single compressed data stream for this purpose, among other attributes. Other ingenious methods include sending a wide-area view, or surround-view, from a single camera, or the use of IPIX (e.g., U.S. Pat. Nos. 5,185,667, 5,313,306, 5,359,363, 5,764,276), which sends a warped view, but is de-warped at each viewer's discretion.

While prior art methods are effective, they rely on a certain level of decision-making of a producer. Accordingly, a need exists for a method of video processing which is less dependent upon the judgment of a video producer.

SUMMARY

Under one illustrated embodiment of this invention multiple video feeds are taken and used to create a new, user controlled vantage point between the multiple video feeds. The effect of this invention is to create new vantage points as if there was a camera that could float between the positions of the other cameras.

This invention provides a novel system for processing multiple video streams. Multiple video cameras provide different angular views of the same subject matter. Knowing the position and orientation of each camera relative to each other or from a defined reference, the video streams are combined using three-dimensionally correct perspective morphing to provide a new video output stream that is an interpolated view between the cameras' views. The interpolated position of the output video is determined by an input that allows any number of views that include or fall between the multiple video streams.

Under illustrated embodiments discussed below, a method and apparatus are provided for synthesizing an image from a plurality of video streams. The method includes the steps of determining an orientation of a first and second video source of the plurality of video streams with respect to a video object lying within a field of view of both the first and second video sources and selecting an orientation of a synthesized video source with respect to the video object. The method further includes the step of interpolating among corresponding images of the first and second video sources to form a stream of perspective images of the video object from the selected orientation of the synthesized source.

DETAILED DESCRIPTION OF A PREFERRED EMBODIMENT

This invention describes the process by which two or more images, whether still images or video streams, are used to create a new image that is an interpolation between the original images. This new image appears as if it was acquired at some point between the original images' acquisition locations. This invention builds on the work of Seitz and Dyer, "View Morphing", Proceedings of SIGGRAPH 1996. In Seitz, their "View Morphing" technique was between two still images. This invention expands that work to include two video sources, or more than two sources, whether stationary or in motion. Further, this invention expands View Morphing to work with "surround" images, such as IPIX's PhotoSphere, or Apple's QuickTimeVR formats.

Figure 1:
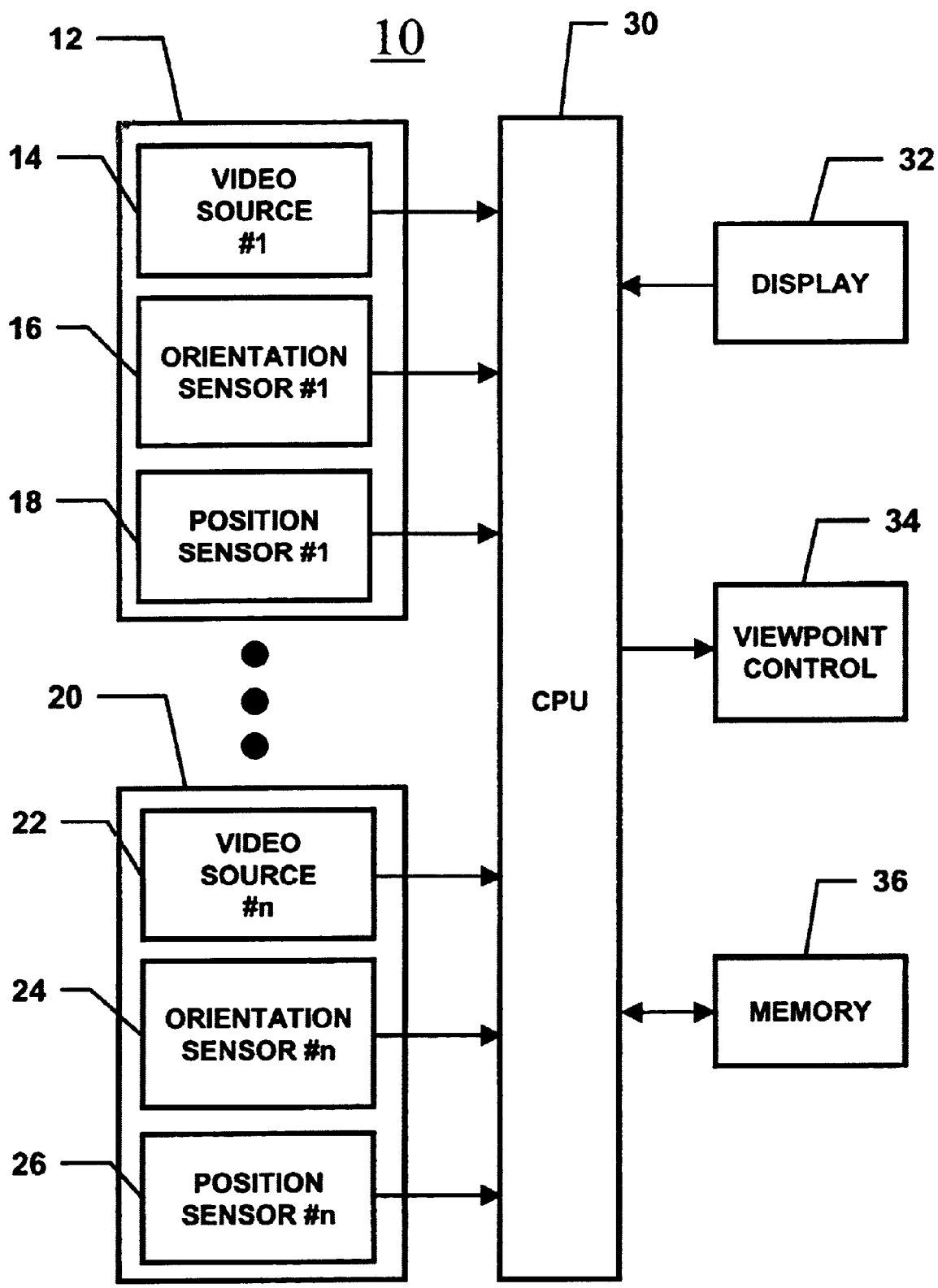
FIG. 1 depicts apparatus for performing extended view morphing and creating a synthesized image in accordance with an illustrated embodiment of the invention.

FIG. 1 depicts a block diagram of a system 10, generally, that may be used under illustrated embodiments for processing images from multiple video sources. Included within the system 10 may be a video processor 30 and multiple video sources 12, 20. Each video source 12, 20 may be provided with a number of orientation and position sensing devices 16, 18, 24, 26 (e.g., LVDTs, GPSs, etc.). Generally, the video sources 12, 20 may be manually "aimed" by a camera operator, but in some cases actuators may be used to aim and position the video sources 12, 20.

The system 10 may be provided with a viewpoint controller 34. The viewpoint controller 34 may generally be a computer "mouse" or "joystick" and may be used to control the position of a "virtual camera" (e.g., camera "AB" of FIG. 2). The "virtual" camera may be considered the source of a synthesized image created by the processor 30 and displayed on the display 32, or stored in memory 36 for later display.

Under a first illustrated embodiment, the View Morphing technique is extended beyond two still images into two video image streams. In Seitz, the two images used for the interpolation process each required control points, or image coordinates that were derived by manually choosing a distinct point in each image that were in the same visual position in each image. The coordinates of each of these control points provided the basis of calculations to determine the relative camera orientations used to acquire each of the images. Extending this technique for video, it would be a laborious process to pick control points for every video frame. However, it is possible to pick control points in one frame or stationary view to determine the relative camera positions, and as long as the cameras maintain their orientation, no further control points are needed. However, in practical use, many camera operators pan their cameras, and the manual process of picking control points requires some operator training. Therefore, it is an object of this invention to include known orientation tracking devices 16, 24 to be placed on the cameras to determine their orientations relative to each other to eliminate the control point picking process.

Under another aspect of the illustrated embodiment, frame synchronization between two or more video sources is achieved and used as a basis for identifying corresponding frames. Where a live video feed is used corresponding frames may be identified by the substantially simultaneous delivery of the frames from the different video feeds. Where stored images are used, a time stamp associated with each frame may be used to identify corresponding frames.

Since the View Morphing process works on a single set of images at a time, it is important that the same instant video image (typically collected within $\frac{1}{30}^{th}$ of a second) from multiple cameras correspond to a similar point in time. This requirement is not rigid, as being several frames apart in time from two video sources could still result in a View Morph that appears to have no errors. The farther apart in time, the more error-prone the final resulting image may be. This synchronization issue can be solved in two ways: 1) synchronize the video sources electrically, or 2) increase the sampling rate of the video to minimize the time difference between two frames (e.g. sample at 60 or 120 frames per second). The latter technique will also improve the resulting View Morph images for fast moving subject matter. This comes at a cost that the algorithm, if performed in real-time, must execute at higher speeds to keep up with the higher frame rates. This is not an issue for off-line processing a video sequence that has previously been captured.

Under a second embodiment of the invention, the View Morphing technique is expanded beyond two video sources. First, the process for using two source images is described. This process is then extended to more than two image sources.

The View Morphing process describes a perspective-correct interpolation between two images. The locus of all the interpolated images is the set of images between the two image sources, as if a virtual camera was connected to a string between the two source image cameras and slid between those two cameras, with the orientation of the virtual camera linearly changing between the orientations of the original source image cameras (see FIG. 2). The virtual camera changes position linearly between the original source image cameras.

Figure 2:
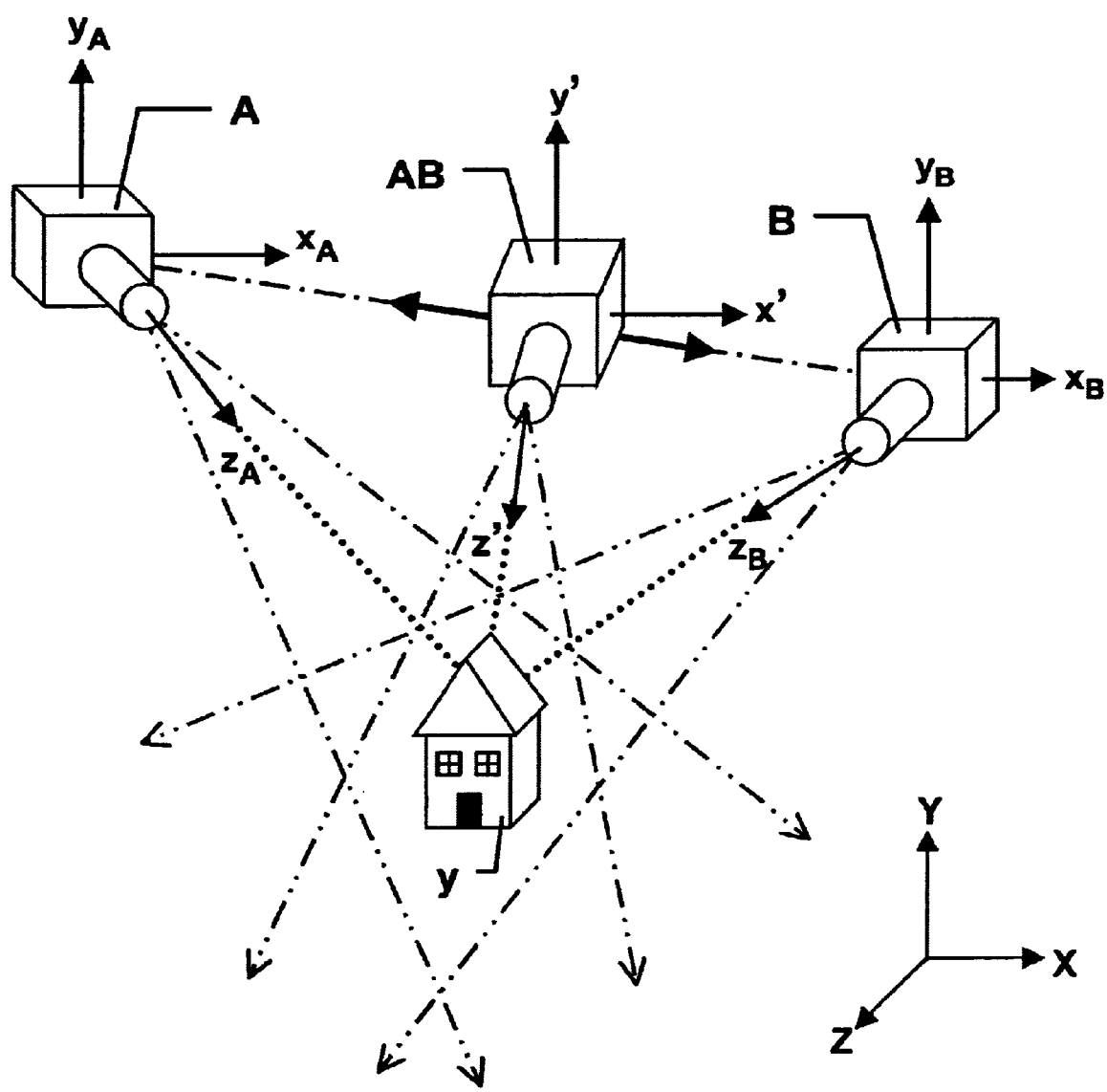
FIG. 2 illustrates morphing of video images from two sources by the system of FIG. 1.

Under the illustrated embodiment, a graphical display such as shown on FIG. 2 may be provided on a portion of the display 32. The viewpoint control device 34 may be used to select a point (e.g., AB) along the "string" between the two cameras A, B. With knowledge or the orientation of the two cameras A, B, a synthesized image may be created by interpolation to reflect a scene that would be available from an actual camera located at point AB.

Interpolation may be accomplished under an algorithm having a number of steps. First, with knowledge of the orientation of the two cameras, an intersection point y of rays $z_A$ and $z_B$ may be identified within corresponding images of the two cameras. With knowledge of y, a set of image coordinates may be determined within the corresponding images. With the image coordinates, a perspective view (centered along ray Z') may be created (e.g., using the Seitz process) from location AB.

Figure 3:
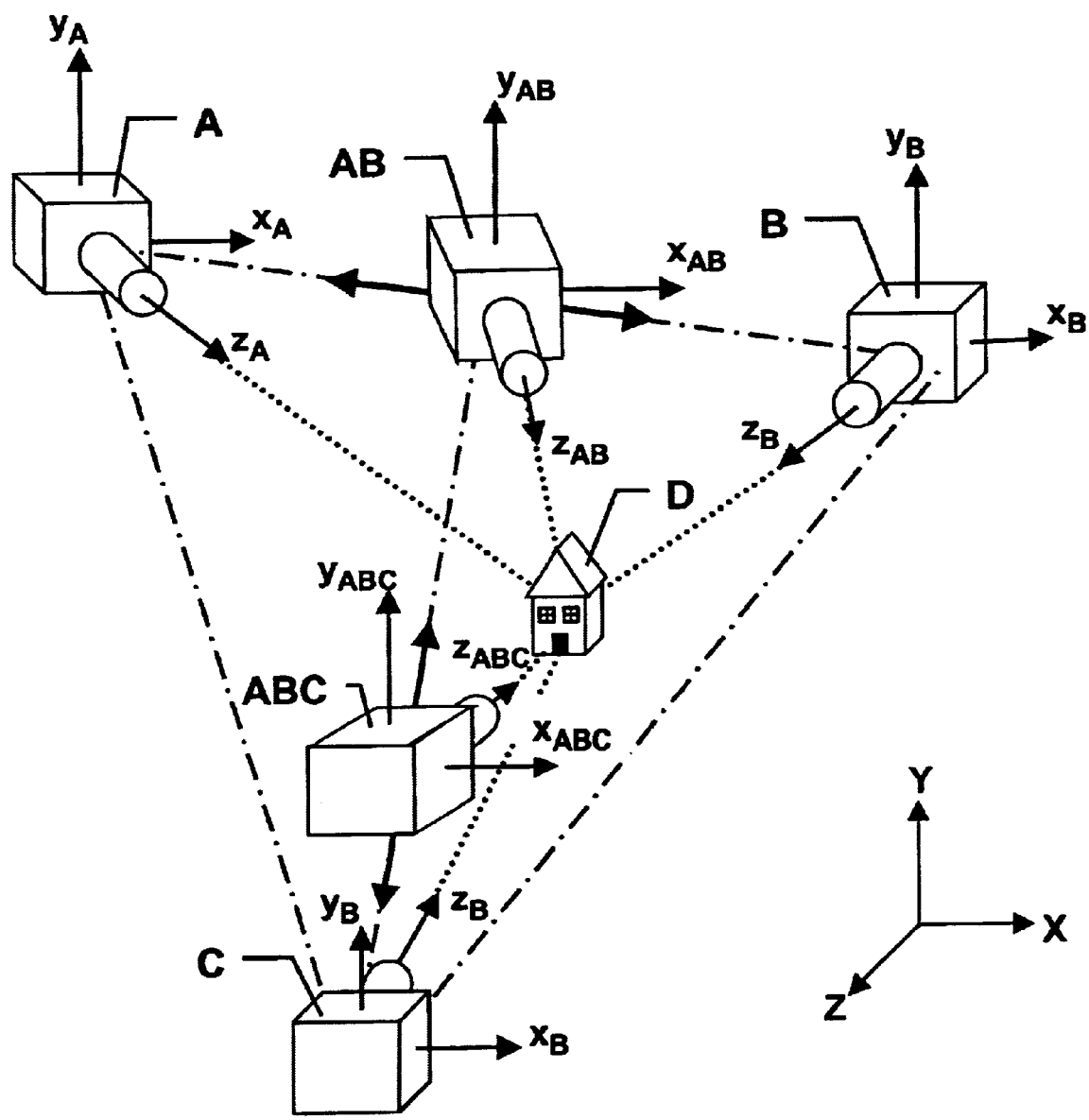
FIG. 3 depicts morphing of an image in three-dimensional space using three video sources by the system of FIG. 1.

Under another illustrated embodiment, the concepts may be extended to include a concept referred to herein as "Geomorphing". "Geomorphing" extends the View Morphing technique to allow a virtual camera to move about an area (e.g., through three-dimensional space), rather than along a single linear path. With Geomorphing, a minimum of three image sources are needed. Geomorphing requires two View Morphing steps (see FIG. 3).

For example, cameras A, B and C provide a view of object D. The orientation and/or locations of cameras A, B and C are provided by devices 16, 18, 24, 26. An operator may select virtual position ABC using viewpoint control 34.

The first View Morphing step occurs between cameras A and B, resulting in the image from virtual camera AB. The second View Morphing step occurs between virtual camera AB and camera C to create the final image from virtual camera ABC.

View Morphing can be extended beyond three image sources to (n) image sources. Extending the three camera example, one can calculate the Viewmorph between the virtual camera ABC and camera D, resulting in the view from virtual camera ABCD. Then one can calculate the image from virtual camera ABCDE, and so on.

Following this trend, there are (n−1) Viewmorph calculations for (n) image sources performed by the processor 30. This technique has the drawback that for every additional Viewmorph calculation, the resultant image will incorporate more visual distortion. This distortion results from the fact that View Morphing is an approximate interpolation between two source images.

Figure 4:
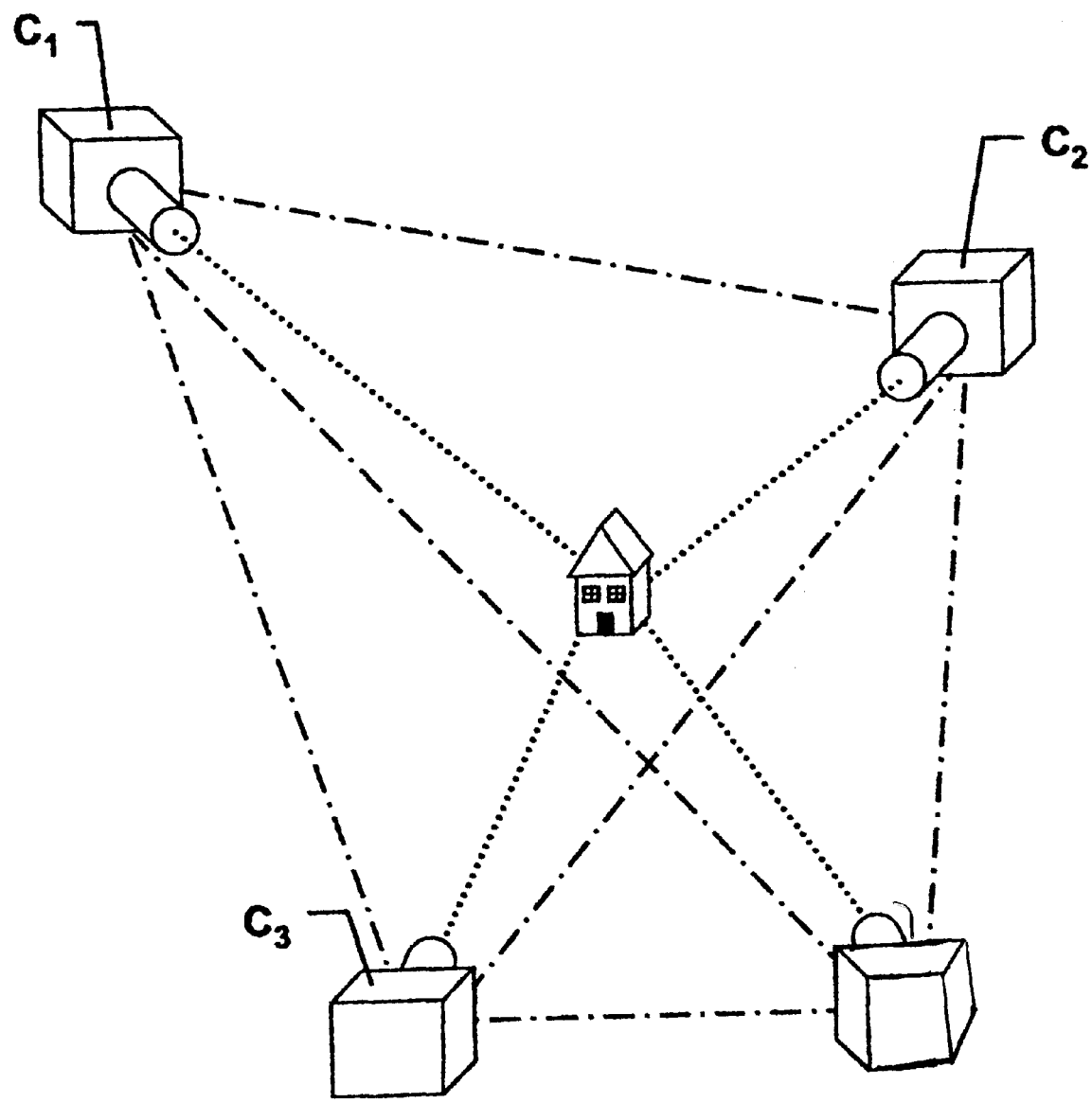
FIG. 4 depicts morphing by the system of FIG. 1 using n video sources.

On the other hand, there is a way to calculate Viewmorphs over an area that limits the calculations to a maximum of two View Morphs. This technique requires choosing the three camera cell that provides the user's desired view (FIG. 4) based upon the location of the virtual camera and the location of the three closest actual cameras.

If the desired view is between cameras C1, C2, and C3, then apply the Geomorph between those three cameras. If the desired view falls within cameras C2, C3, and Cn, or within cameras C1, C3, and Cn, then apply the Geomorph between cameras C2, C3, and Cn, or C1, C3, and Cn, respectively. By using this cellular method, it is possible to cover large areas. An example of this method is to provide a virtual camera view anywhere around a basketball court, using strategically located cameras around the arena. As the virtual camera pans to a three camera cell boundary, switch cells to the adjacent three camera cell to provide a smooth pan.

Figure 5:
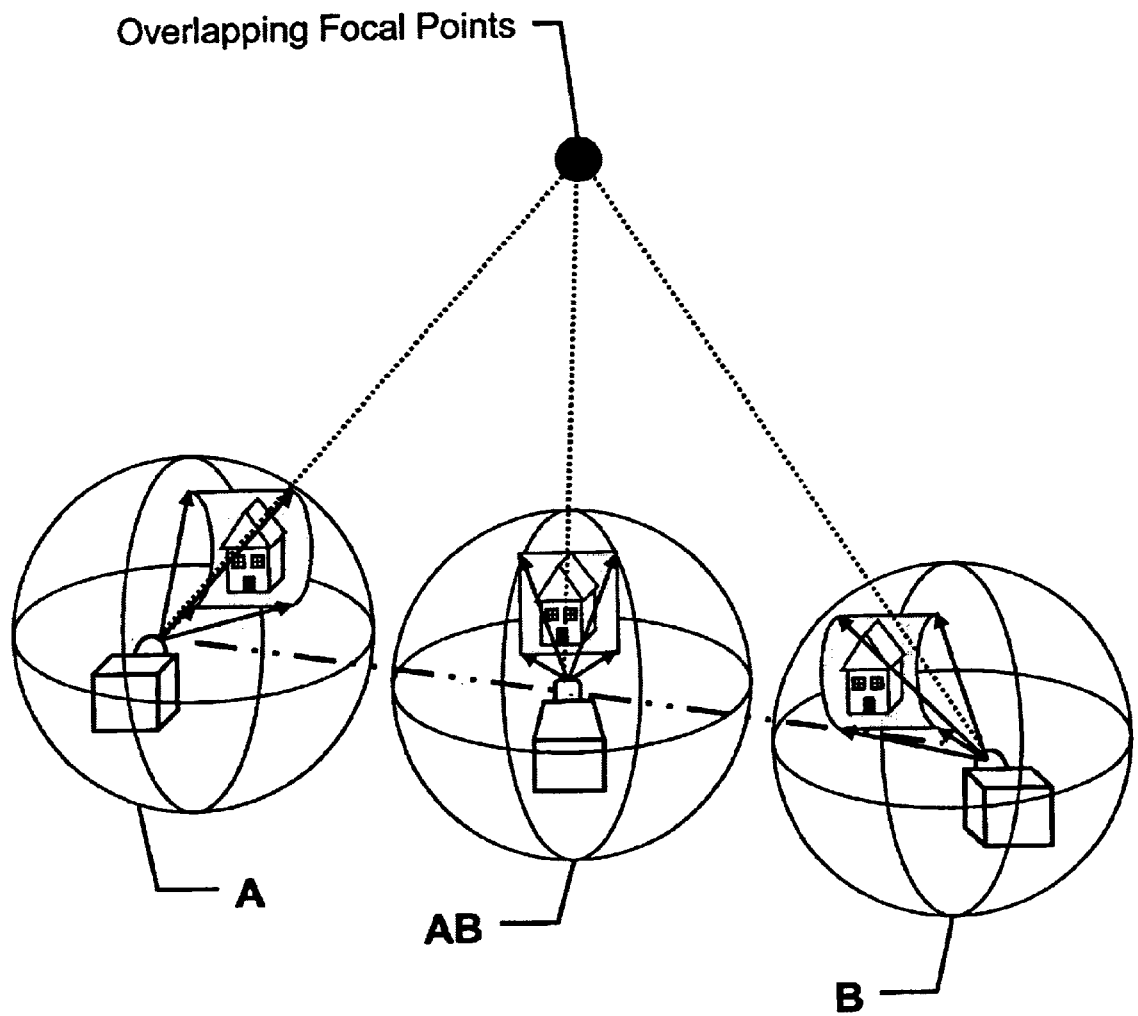
FIG. 5 depicts morphing by the system of FIG. 1 within one or more PhotoSpheres.

Under another illustrated embodiment, View Morphing and the aforementioned techniques may be extended to "surround" images, whether of still pictures or a video stream, or of action-based video streams. Demonstrating the simplest case, FIG. 5 depicts three "PhotoSpheres" with the current views having an overlapping view area. For purposes of understanding the concept, it may be assumed that PhotoSphere A has the same image elements in the same locations as PhotoSphere B.

First the orientation of virtual camera AB is received from the user's input 34. Then the orientation of cameras A and B are calculated (e.g., from sensors 16, 24) to provide overlapping view (intersecting focal points are preferred). Camera views for A and B are then obtained from their respective PhotoSpheres based upon the computed orientations. Finally, the Viewmorph is computed for virtual camera AB. Regular camera views may be obtained from their respective PhotoSpheres using known techniques (e.g., regular camera views are dewarped PhotoSpheres).

Figure 6:
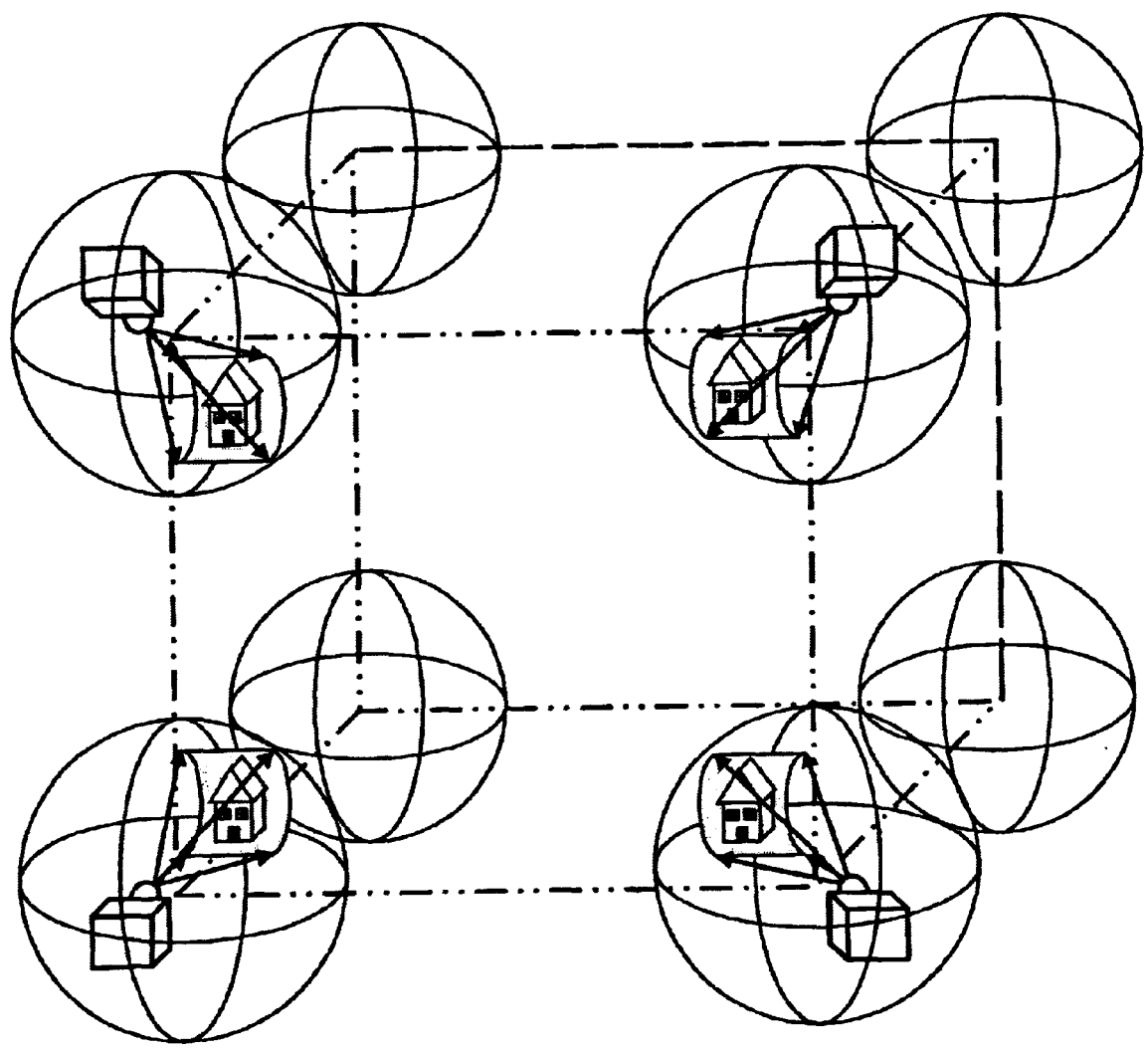
FIG. 6 depicts morphing by the system of FIG. 1 within any number of PhotoSpheres.

This PhotoSphere technique can be extended to the Geomorph (three image sources) and all of the prior described techniques in this invention. With enough properly positioned PhotoSpheres, an entire volume can be traversed, as in FIG. 6. It is even possible with the proper configuration to create a virtual camera view that looks from the center outward. Another possibility is to create smooth video paths from one PhotoSphere to another.

Under another illustrated embodiment, the system 10 may be used to allow multiple users on the Internet to view a remote video location on their personal computer with the freedom to each manipulate their viewpoint through various orientations and translations in real-time.

For example, the ability to "virtually" walk around and through the Pyramids of Egypt may be provided. Real-time live video will be the desired outcome and provided from cameras within the Pyramids.

Video cameras containing imaging systems that capture 180 degree fields-of-view are strategically placed around and inside the site. The numbers of cameras and their respective positions and orientations are chosen to provide overlapping views to create an arbitrarily shaped bounding view volume, that the user can view. These video cameras are connected to the Internet and provide both the digital video streams and each camera's respective position and orientation to the users' computer.

Under another illustrated embodiment, content viewing is provided. A user, connected to the Internet through their computer, is allowed access the multiple video streams. Software in their computer executes the Geomorphing algorithm explained above. In this illustrated embodiment, the user's initial coordinates and orientation of their "floating camera" are given default values. The user is then free to change these coordinates and orientation at-will, through the computer and input device such as a mouse or keyboard.

For each position and orientation, the digital video feeds of the three closest remote cameras are selected. A single frame of each of these video feeds are gathered into the computer's memory. Then, a known algorithm de-warps each PhotoSphere image based upon the user's "floating camera" orientation to provide three new images. Two of these images are then processed by the Viewmorphing process to create an intermediate image. This intermediate image along with the third, remaining image are processed by the Viewmorphing process. The image resulting from this secondary Viewmorphing process is then displayed on the user's computer display. This process is repeated for each set of digital video frames (typically at 30 frames-per-second). This process utilizes the user's desired current position and orientation, which could change from frame to frame.

A final note on this embodiment is that there can be more than one user. The same set of digital video feeds and respective capturing camera's position and orientation are broadcast to many users' computers. Each user can then provide their own coordinate and position input to the Geomorphing process on their respective computer. Each user can therefore be viewing different portions of this remote location independently of the other users.

A specific embodiment of a method and apparatus for a extended view morphing according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of synthesizing at least one image from a plurality of video streams, such method comprising the steps of:
   determining an orientation of at least two video sources of the plurality of video streams with respect to each other, the at least two video sources having a video object lying within a field of view of the at least two video sources;
   selecting a location of a synthesized video source with respect to the video object; and
   interpolating among corresponding synchronized frames from the at least two video sources to synthesize the at least one image of the video object as viewed from the selected location of the synthesized source, wherein the at least one image is synthesized without using a three-dimensional model of the video object.

2. The method of synthesizing an image as in claim 1 further comprising defining corresponding images as images collected at substantially a single instant in time but from different video sources of the plurality of video sources.

3. The method of synthesizing an image as in claim 1 wherein the step of determining an orientation of the at least two video sources further comprising determining three-dimensional location of the at least two video sources.

4. The method of synthesizing an image as in claim 3 further comprising determining a three-dimensional location of the synthesized video source.

5. The method of synthesizing an image as in claim 4 further comprising determining three-dimensional locations of at least three video sources.

6. The method of synthesizing an image as in claim 5 further comprising interpolating three-dimensional locations of at least three video sources.

7. The method of synthesizing an image as in claim 1 wherein the step of determining an orientation of the at least two video sources further comprises selecting a portion of a PhotoSphere as the video source.

8. Apparatus for synthesizing at least one image from a plurality of video streams, such apparatus comprising:
   means for determining an orientation of at least two video sources of the plurality of video streams with respect to each other, the at least two video sources having a video object lying within a field of view of the at least two video sources;
   means for selecting a location of a synthesized video source with respect to the video object; and
   means for interpolating among corresponding synchronized frames from the at least two video sources to synthesize the at least one image of the video object as viewed from the selected location of the synthesized source, wherein the at least one image is synthesized without using a three dimensional model of the video object.

9. The apparatus for synthesizing an image as in claim 8 further comprising means for defining corresponding images collected at substantially a single instant in time but from different video sources of the plurality of video sources.

10. The apparatus for synthesizing an image as in claim 8 wherein the means for determining an orientation of the at least two video sources further comprising means for determining three-dimensional location of the at least two video sources.

11. The apparatus for synthesizing an image as in claim 10 further comprising means for selecting a three-dimensional location of the synthesized video source.

12. The apparatus for synthesizing an image as in claim 11 further comprising means for determining three-dimensional location of at least three video sources.

13. The apparatus for synthesizing an image as in claim 12 further comprising means for interpolating perspective images from among the least three video sources.

14. The apparatus for synthesizing an image as in claim 8 wherein the means for determining an orientation of the at least two video sources further comprising means for selecting a portion of a PhotoSphere as the video sources.

15. Apparatus for synthesizing at least one image from a plurality of video streams, such apparatus comprising:

at least two orientation sensors, located respectively at at least two videos sources, adapted to determine an orientation of the at least two video sources of the plurality of video streams with respect to each other, the at least two video sources having a video object lying within a field of view of the at least two video sources;

a view point controller adapted to select a location of a synthesized video source with respect to the video object; and a video processor adapted to interpolate among corresponding synchronized frames received from the at least two video sources to synthesize the at least one image of the video object as viewed form the selected location of the synthesized source, wherein the at least one image is synthesized without using a three-dimensional model of the video object.

16. The apparatus for synthesizing an image as in claim 15 further comprising means for defining corresponding images collected at substantially a single instant in time but from different video sources of the plurality of video sources.

17. The apparatus for synthesizing an image as in claim 15 wherein the at least two orientation sensors further comprising at least two position sensors adapted to determine three-dimensional locations of the least two video sources.

18. The apparatus for synthesizing an image as in claim 17 wherein the viewpoint controller further comprises a veiwpoint position controller adapted to determine a three-dimensional location of the synthesized video source.

19. The apparatus for synthesizing an image as in claim 18 further comprising a position controller adapted to determine a three-dimensional location of a third video source.

\* \* \* \* \*